US005505865A

United States Patent [19]
Kumar et al.

[11] Patent Number: 5,505,865
[45] Date of Patent: Apr. 9, 1996

[54] SYNTHESIS PROCESS FOR ADVANCED CERAMICS

[75] Inventors: Kaplesh Kumar, Wellesley; Anthony Petrovich, Tewksbury, both of Mass.

[73] Assignee: Charles Stark Draper Laboratory, Inc., Cambridge, Mass.

[21] Appl. No.: 869,887

[22] Filed: Apr. 14, 1992

Related U.S. Application Data

[63] Continuation of Ser. No. 764,942, Sep. 24, 1991, abandoned, which is a continuation of Ser. No. 378,411, Jul. 11, 1989, abandoned.

[51] Int. Cl.$^6$ .................................................. C04B 35/26
[52] U.S. Cl. ........................... 252/62.62; 264/65; 264/66; 423/593; 423/594; 501/1
[58] Field of Search ....................... 501/1, 112; 505/737, 505/1; 420/901; 252/521, 62.62; 423/593, 594; 264/65, 66

[56] References Cited

U.S. PATENT DOCUMENTS

| | | | |
|---|---|---|---|
| 3,274,110 | 9/1966 | Getto | 252/62.62 |
| 3,428,416 | 2/1969 | Gie et al. | 252/62.62 |
| 3,860,524 | 1/1975 | Goldman | 252/62.62 |
| 3,948,785 | 4/1976 | Berchtold | 252/62.62 |
| 4,059,664 | 11/1977 | Nicolas et al. | 252/62.62 |
| 4,075,391 | 2/1978 | Berg | 252/62.62 |
| 4,094,061 | 6/1978 | Gupta et al. | 264/61 |
| 4,247,500 | 1/1981 | Dixon et al. | 252/62.62 |
| 4,874,598 | 10/1989 | Oda et al. | 423/593 |
| 4,960,738 | 10/1990 | Hori et al. | 501/128 |

FOREIGN PATENT DOCUMENTS

| | | | |
|---|---|---|---|
| 0301655 | 2/1989 | European Pat. Off. | 505/737 |
| 0086025 | 5/1985 | Japan | 423/608 |
| 2027309 | 2/1987 | Japan | 423/592 |
| 0259927 | 10/1988 | Japan | 505/737 |

OTHER PUBLICATIONS

"Alumina based ceramics and their preparation" Hayashi et al., (1988) Japan EP 284418 (Sep. 28, 1988) Chem. Abstract Answer #4 of 8.

"Fine Powders by Spray Pyrolysis Technique" Kato et al. (1977) *Funtai Oyobi Funmatsuyakin* 24(8) pp. 219–222— Chemical Abstract.

*Introduction to the Principles of Ceramic Processing*, James Reed pp. 38, 40, 44, 47–51 John Wiley & Sons (1988).

"Ba–Cu–O Superconducting Film by a Spray Pyrolysis Method" Kawai et al. (Published Sep. 18, 1987) pp. L1740–L1742.

*Ceramic Processing* Materials Advisory Board (1969) pp. 23–29. (See pp. 24–25).

*Hawley's Condensed Chemical Dictionary* 11th Edition (1987) Van Nostrand Reinhold Company (New York) pp. 220 and 636.

deLau, J. G. M., Ceramic Bulletin, "Preparation of CeramicPowders from Sulfate Solutions by Spray Drying and Roast (List continued on next page.)

*Primary Examiner*—Paul Marcantoni
*Attorney, Agent, or Firm*—Weingarten, Schurgin, Gagnebin & Hayes

[57] ABSTRACT

A process for synthesizing advanced ceramics having superior microstructures and properties. Metal oxide powder particles are produced from solutions of soluble salts of the respective metals by a spray decomposition process. The as-formed powders are heated in an inert atmosphere at a temperature below their sintering temperature and for a time sufficient to cause the oxide powder particles to densify without sintering, and the densified powder is then compacted under high pressure and finally sintered at a temperature above that employed in the initial heating step. Products of this process possess superior magnetic and structural uniformity, excellent grain structure, and very high mechanical strength relative to ceramics prepared without using a heat treatment for densification prior to the compacting step.

5 Claims, 7 Drawing Sheets

OTHER PUBLICATIONS ing," 49 No. 6:572–574 (1970).

K. Kumar and A. Petrovich, "Chemically Homogeneous Fine-Grained Mn–Zn Ferrites by Spray Decomposition" (Abstract), 4th Joint MMM–Intermag Conference, Vancouver, British Columbia, Canada, Jul. 12–15, 1988.

Della M. Roy et al, "Preparation of Fine Oxide Powders by Evaporative Decomposition of Solutions", *Ceramic Bulletin*, 56, pp. 1023–1024, 1977.

T. Pannaparayil, et al, "A novel low-temperature preparation of several ferrimagnetic spinels and their magnetic and Mossbauer characterization", *J. Appl. Phys.*, 64, pp. 5641–5643, 1988.

Kumar, K.; Petrovic, A.; Williams, C. and VanderSande J. B., Chemically Homogeneous fine-grained Mn–Zn ferrites by spray drying[a]; J. Appl. Phys. 65(5), 1 Mar. 1989, pp. 2014–2016.

5,505,865

1

SYNTHESIS PROCESS FOR ADVANCED CERAMICS

This application is a continuation of application Ser. No. 07/764,942, filed Sep. 24, 1991, now abandoned, which is a continuation application of Ser. No. 07/378,411, filed Jul. 11, 1989, now abandoned.

FIELD OF THE INVENTION

This invention relates to ceramics, and more particularly, to a process for synthesizing advanced ceramics having superior microstructures and properties.

BACKGROUND OF THE INVENTION

It is known that ceramic materials can be synthesized by spray-drying mixed aqueous solutions of salts of the desired metallic constituents, pressing the resulting homogeneous powder into a compact, and sintering. The products of this process are non-uniform porous structures, however, because the as-formed powder cannot be cold compacted, in the green state, to a level of densification sufficiently high for subsequent high temperature sintering to be effective. Reducing the particle size of the initially-formed powder mechanically prior to compaction and sintering leads to only marginal improvements in the final product.

Although such non-uniform porous materials are acceptable for certain purposes, it is highly desirable in many applications to have structurally and compositionally uniform, low porosity, fine grain ceramic materials. An example of a type of ceramic requiring such properties is manganese-zinc ferrite for use in magnetic suspensions.

Manganese-zinc ferrites for magnetic applications should have minimum spatial and time-dependent variations in permeability, and should be mechanically strong to resist damage during machining and assembly of parts. As spatial permeability variation results from small variations in microstructure and from mechanically-induced defects, minimization of such variations requires uniform fine grain microstructures. Time dependent changes in permeability depend on ferrite chemistry, therefore necessitating compositional uniformity for time-stable materials. Mechanical strength for a given chemistry depends on the level of densification and on grain size achieved during sintering.

Many other applications also require ceramic materials having superior compositional and structural uniformity, fine grain size, and high strength. This need is met in the present invention.

SUMMARY OF THE INVENTION

This invention provides a general process for synthesizing a wide range of ceramic materials having fine grain structures, high densities, and enhanced mechanical strength. The process is based on the unexpected discovery that metal oxide powders produced by a spray-drying process can be densified by heating them below their sintering temperatures. The predensified oxide powders then serve as superior starting materials for manufacture of the corresponding ceramics by compaction and sintering.

The process of the invention involves spraying into a heated chamber droplets of a solution of soluble salts of the metallic constituents of a ceramic to be prepared, which results in ultimate formation of a homogenous powder of metal oxides after evaporation of the solvent and decomposition of the metallic salts; heating this powder at a temperature and for a time sufficient to cause the oxide powder particles to densify without sintering; subjecting the densified powder to pressure to form a compact; and finally, sintering the compact at a temperature higher than the prior heating step.

In this process, the step of heating the as-formed metal oxide powder to densify it without causing sintering to occur is apparently without precedent in the art, and ultimately results in ceramic products having vastly improved properties.

DESCRIPTION OF THE DRAWING

The invention will be more completely understood from a consideration of the following detailed description taken in conjunction with the drawing, in which.

DETAILED DESCRIPTION

Figure 1:
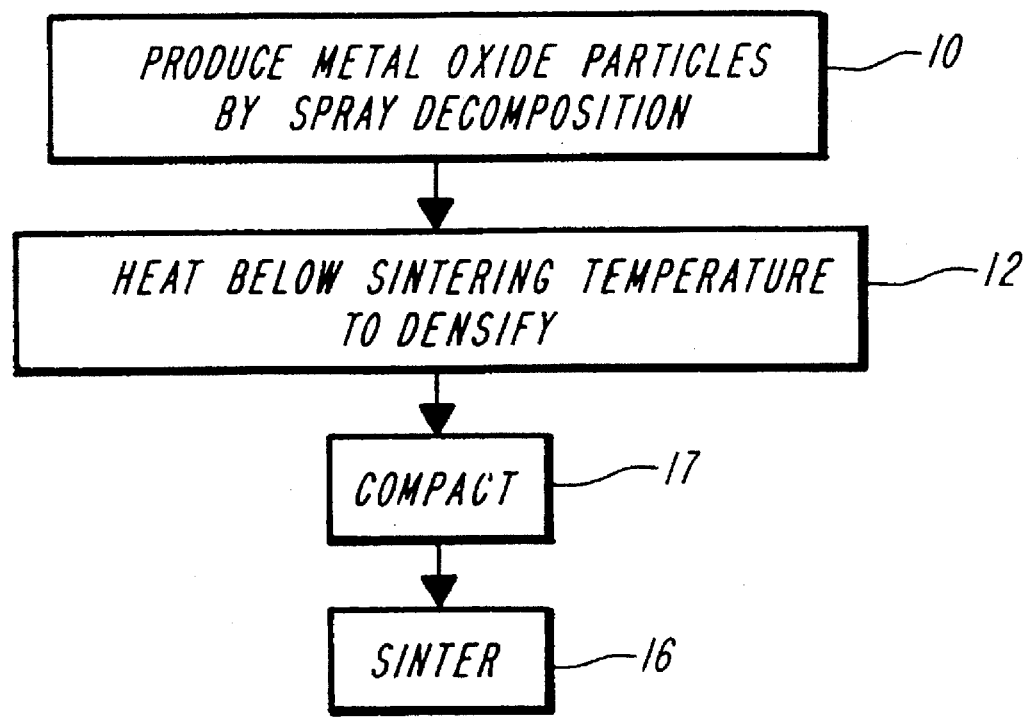
FIG. 1 shows a block diagram illustrating the steps of the process of the invention.

FIG. 1 shows the steps of the process of the invention. Homogeneous particles of the metal oxides to be employed in the ceramic are produced in a spray decomposition process 10 in a manner known to the art. In this process, solutions of soluble metal salts are sprayed into a heated chamber in the form of microdroplets by means of an appropriate nebulizer or ultrasonic nozzle. The solvent employed is generally water, but organic solvents may also be used provided that the metal salts selected are sufficiently soluble. In the heated chamber the solvent evaporates, leaving microscale salt particles which in turn decompose in the presence of heat and oxygen to yield particles of the respective oxides of the metals. The product is believed to be a mixed oxide and not a mixture of oxides.

The size of the oxide powder particles produced in the spray decomposition process is a function of the concentration of the original solution of metal salts, the highest concentrations resulting in relatively large particles, while lower concentrations produce smaller particles. In general, the best ceramics are produced from the smallest metal oxide particles. The metal oxide particles formed in the spray decomposition process are believed on the basis of electron microscopic investigations to be predominantly hollow.

The metal oxide particles produced in spray decomposition step 10 are next heated below their sintering temperature for a time sufficient to cause densification, as shown in step 12. This heating step is preferably carried out in an electric resistively heated furnace in which a selected atmosphere may be maintained. The atmosphere is preferably argon of 99.99+% purity.

The temperature employed in heating step 12 depends on the material being treated, the maximum temperature being just below that temperature at which sintering begins to occur, the preferred temperature being approximately 200° C. below the minimum sintering temperature for the metal oxide particles being treated, and the minimum temperature being that temperature necessary for densification of the oxide powder particles to occur. For the manganese-zinc ferrite materials employed as working examples herein, the heating of the metal oxide powder particles is carried out in the range 875°–975° C., preferably 900°–960° C. Heating is carried out for times generally in the range of 6–24 hours at the selected temperature.

Application of heating step 12 to the exemplary ferrites herein causes the density of the as-formed metal oxide powder particles to increase to between 50% and 90% of the theoretical density. Similar densifications are expected to occur with other metal oxide powder compositions produced by the spray decomposition technique.

After being subjected to the heat treatment step 12, the metal oxide powder is compacted in step 14 in the usual manner. Compaction is typically carried out in a press which provides a mold for the powder preform and a stamping mechanism to force consolidation for the powder under high pressure, preferably in the range 20,000 to 60,000 psi.

Finally, the compact is sintered as shown in step 16 form the ultimate ceramic product. It is found that for a given material, the temperature required for the sintering operation is lower than that required for an otherwise identical material which has not been subjected to a prior heat treatment/ densification.

Sintering times are generally on the range of 16–48 hours. The final product is a very fine grain uniform ceramic material having a density approximately the same as commercial ceramics. Products of the process of the invention are superior in terms of their magnetic and structural uniformity, grain structure and mechanical strength to otherwise similar ceramics formed from particles of metal oxide which have not been subjected to a heat treatment for densification prior to the compacting step.

EXPERIMENTAL

Structures of powders and sintered materials were characterized using standard optical, x-ray and transmission electron microscopic techniques. The etchant used on polished metallographic surfaces consisted of one part nitric acid, one part hydrofluoric acid, and two parts of water. Transmission electron microscopy was performed using a JEOL 200 CX electron microscope. Mossbauer spectroscopy was also used to analyze the powders with a 20 milli Curie $Co^{57}$ source and 512-channel multichannel analyzer. Magnetic permeability and disaccommodation behavior were examined with an apparatus capable of detecting fractional changes in magnetic permeability, defined as $D=[\mu(t_1)-\mu(t)]/\mu(t_1)$, as small as 0.0001 within 1 millisecond after magnetic excitation. In the equation, $\mu(t_1)$ is the initial permeability at time $t_1$ and $\mu(t)$ is the permeability at a subsequent time t.

Disaccommodation testing was performed with toroidally-shaped specimens with two sets of windings. The first set of windings provide a magnetic field large enough to magnetically activate the specimen. The second set of windings are excited with an a.c. current. By measuring the change in a.c. voltage for a constant a.c. current the changing permeability can be determined. Apparatus to perform such measurements includes a device for providing a high current excitation and a system for measuring a.c. voltage which a constant current is maintained.

Mixed oxide powders of manganese-zinc ferrite having the composition $(Fe_2O_3)_{0.52}(MnO)_{0.30}(ZnO)_{0.18}$ were produced from aqueous solutions containing iron, manganese and zinc nitrates in the molar proportions desired for the metals in the final ferrite, using known spray-decomposition techniques. For details see D. M. Roy et al., Am. Ceram. Soc. Bull., 56, 11 (1977), which is incorporated herein by reference.

The starting solutions were atomized with an ultrasonic nozzle, producing a fine mist of liquid droplets. These microdroplets were allowed to fall in air through a 960° C. zone of a furnace, during which process the water evaporated and the metallic nitrate salts decomposed to yield oxide powder particles having similar cation concentrations.

Two batches of ferrite precursor were produced in this way from solutions having total metal concentrations of 0.67 and 0.12 moles per liter, respectively.

Figure 2A:
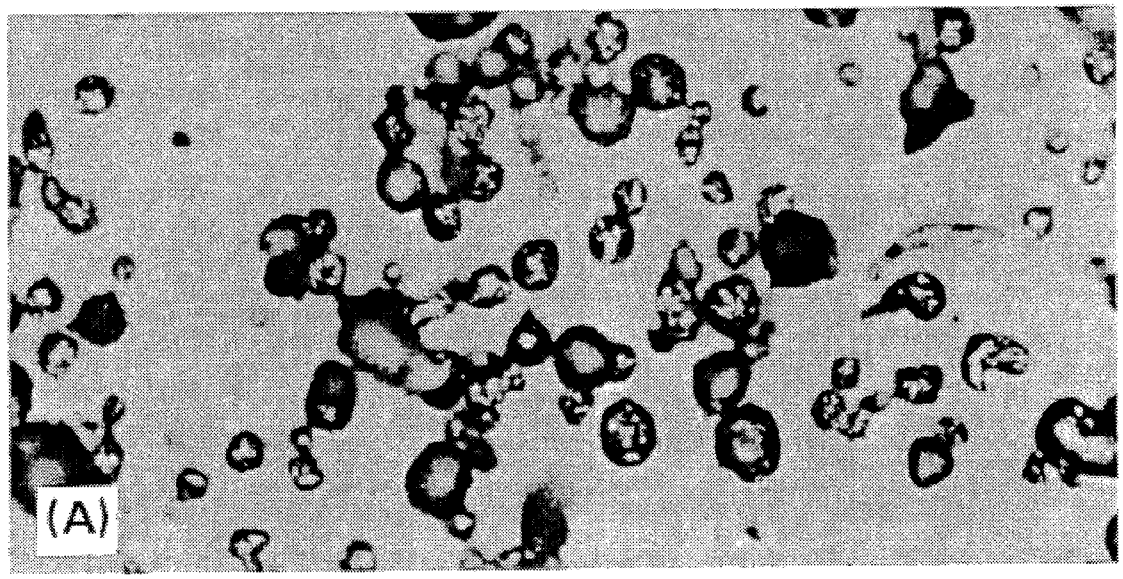
FIG. 2A shows particles of a manganese-zinc ferrite powder produced by spray decomposition of a solution containing a total metal ion concentration of 0.67 moles per liter of manganese, zinc, and iron in the desired proportions.

FIG. 2A shows the ferrite precursor powder particles produced from the solution containing 0.67 moles per liter of metal. These powder particles are approximately spherical with a reasonably narrow size distribution and appear to be approximately 25 micrometers in diameter on the average.

Figure 2B:
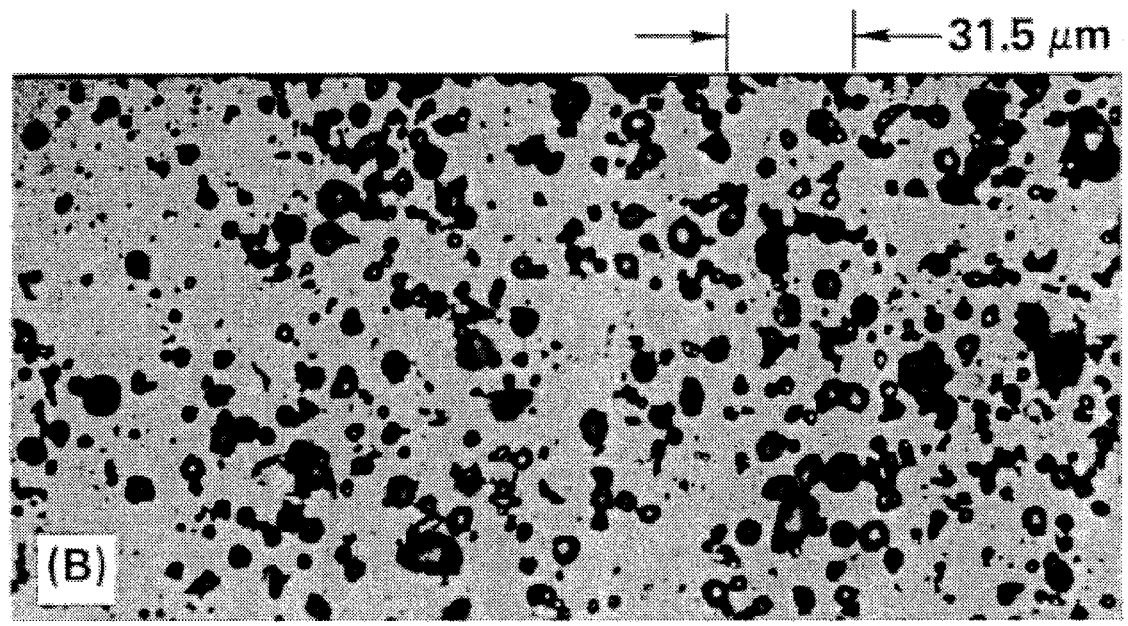
FIG. 2B shows particles of a manganese-zinc ferrite powder of the same nominal composition as that shown in FIG. 2, formed by spray decomposition of a solution containing a total metal ion concentration of 0.12 moles per liter.

FIG. 2B shows the ferrite precursor powder particles produced from the solution in which the total metal ion concentration was 0.12 moles per liter. In this latter case it is seen that the ferrite precursor powder consists of much smaller particles which have diameters of about 3 micrometers. These results show that the sizes of particles produced in the spray-drying process are a function of the concentrations of the starting solutions of metal salts.

Figure 3A:
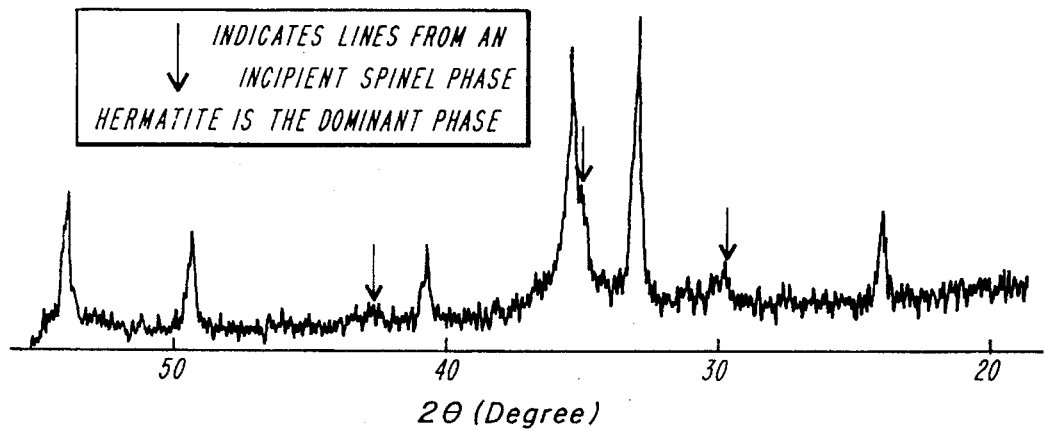
FIG. 3A shows the x-ray diffraction pattern of the manganese-zinc-ferrite powder of FIG. 2A.

FIG. 3A shows the x-ray diffraction pattern of the as-formed ferrite precursor powder shown in FIG. 2A above. The x-ray diffraction results show that the ferrite precursor contains a high percentage of hematite, plus a small amount of a poorly developed manganese-zinc ferrite spinel phase.

Figure 3B:
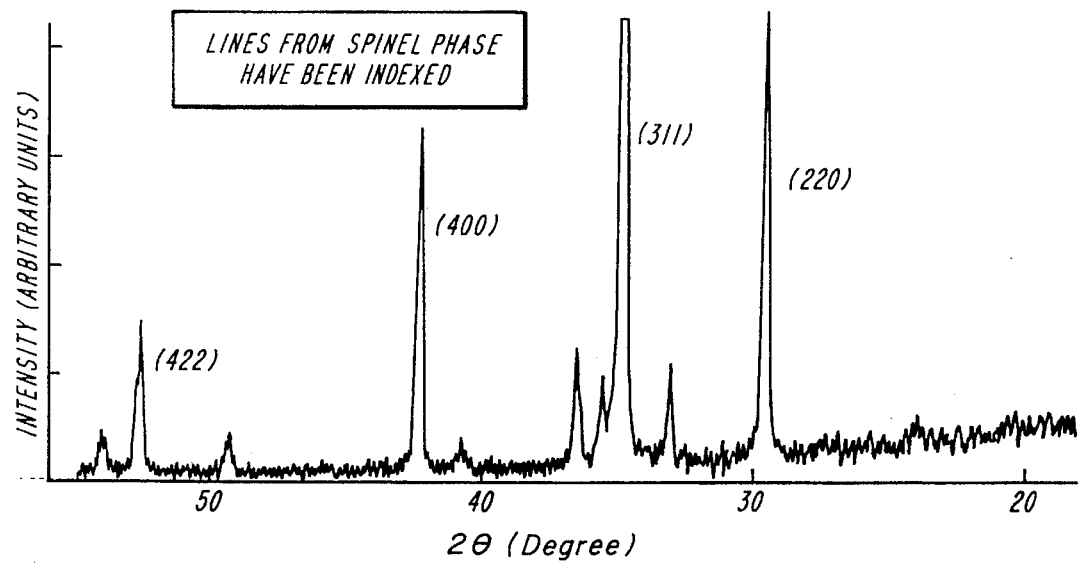
FIG. 3B shows the x-ray diffraction pattern of the manganese-zinc ferrite of FIG. 3A after treatment at 900° C. for five hours in an argon atmosphere.

The as-formed ferrite precursor powder was next heated at 900° C. for six hours in an argon atmosphere. This treatment converted most of the powder to the magnetic spinel phase of the manganese-zinc ferrite, though a minor amount of hematite phase remained. This is illustrated in FIG. 3B which shows the x-ray diffraction pattern of the ferrite powder of FIG. 3A after the heat treatment. The density of the heat-treated material is higher than that of the as-formed powder.

Analysis of these data as well as Mossbauer spectra of the respective materials indicated that in the as-formed powder, about 42% of the iron was present in the hematite phase, but in the heat-treated powder the percentage of iron in the hematite phase was reduced to about 12%.

A number of heat treatment experiments were conducted on as-formed ferrite precursor powder in the temperature range of 900° to 960° C., over times ranging from 5 to 10 hours. The effectiveness of these heat treatments in causing densification of the initial powders was gauged by observing the reduction in the volume of the powder after the heat treatment. In all cases an observable reduction in volume was seen. The heat treatment also was observed to reduce the porosity of final sintered ferrite samples relative to that observed in sintered samples which had not received such heat treatments.

Sintering studies were conducted on ferrite powders which were cold isostatically pressed at about 55 kpsi prior to sintering. Sintering temperatures were evaluated over the range of 1100° to 1300° C., and oxygen partial pressure was evaluated over the range 50 to 5000 ppm in the argon atmosphere. Sintering was evaluated as a function of the time at the sintering temperature and as a function of the oxygen partial pressure in the atmosphere during the sintering step. The compacts were sintered at predetermined temperatures in the desired level of oxygen, and then cooled slowly to ambient temperature. At the onset of the cooling cycle the sintering atmosphere was replaced quickly with grade 5 argon while the sample was still within 50° C. of the sintering temperature.

Figure 4:
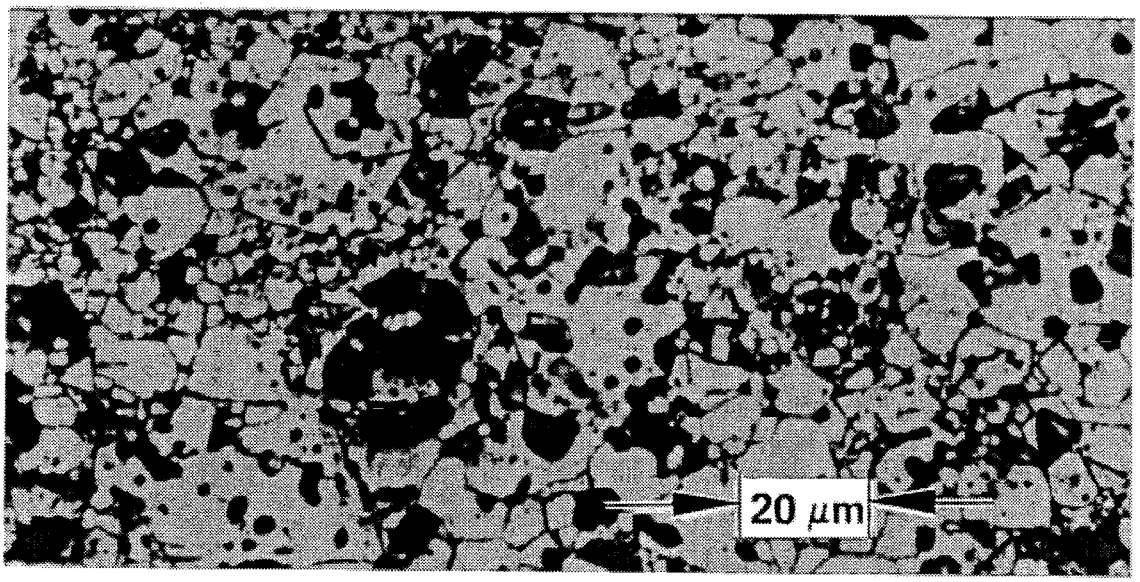
FIG. 4 is a photomicrograph at 500× magnification of the microcrystalline structure of a prior art type manganese-zinc ferrite ceramic formed from ferrite powder of nominal 10 µm particle size produced by spray decomposition, which material was directly compacted and then sintered at 1250° C. for sixteen hours in an argon atmosphere containing 0.3% oxygen.

Sintering of compacts from as-formed ferrite precursor powders produced microstructures with fairly large non-uniform porosities. An example of such a material is illustrated in FIG. 4 which shows the microstructure of an as-formed ferrite precursor powder which has been compacted and sintered at 1250° C. for 16 hours in an argon atmosphere containing 0.3% of oxygen, but without a heat treatment step prior to compacting. This material shows many voids of widely differing sizes. Attempts at sintering ferrite precursor powders after crushing them to a much finer mesh by means of a shatter box produced similar results.

Figure 5A:
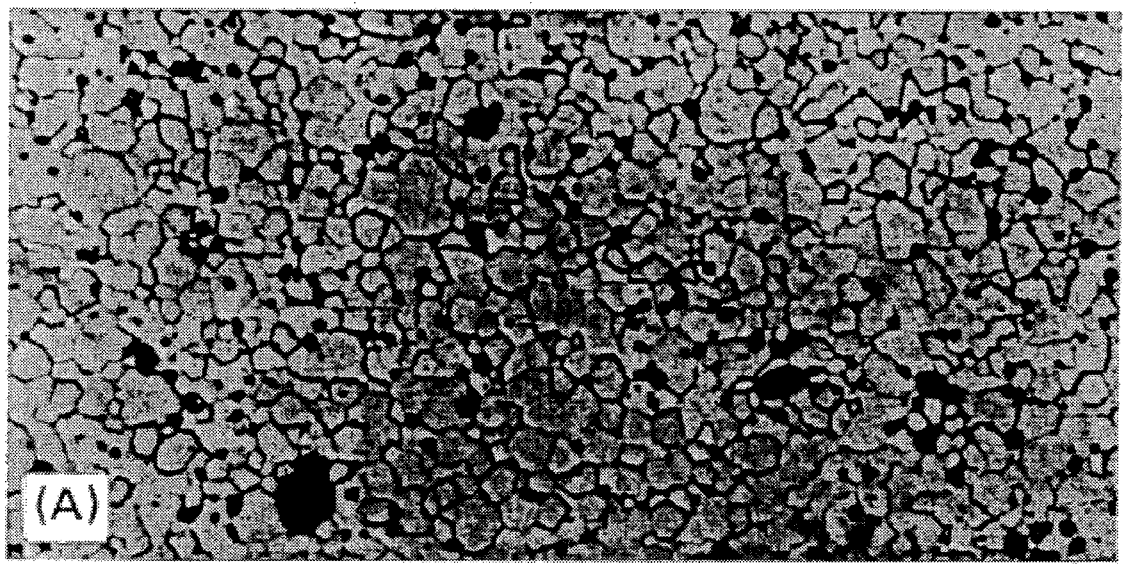
FIG. 5A is a photomicrograph at 500× magnification of the microcrystalline structure of manganese-zinc ferrite ceramic produced from nominal 3 µm ferrite powder formed by spray decomposition, which material was first heated at 900° C. for six hours in an argon atmosphere, then compacted, and finally sintered at 1100° C. for sixteen hours in argon containing 90 ppm of oxygen.
Figure 5B:
FIG. 5B is a photomicrograph at 500× magnification of the microcrystalline structure of a typical commercial ferrite.

The best microstructures were produced with heat-treated 3 micrometer powders sintered between 1100° C. and 1150° C. for sixteen hours in an argon atmosphere containing 90 ppm of oxygen. The microstructures were single phase and characterized by fine grains, no secondary grain growth, and small pores located at the grain boundaries. This is illustrated in FIG. 5A, which shows the microstructure of a final product produced from 3 micrometer ferrite powder which had been heated at 900° for six hours in an argon atmosphere, compacted, and sintered at 1100° C. for sixteen hours in an argon atmosphere containing 90 ppm of oxygen. The degree of densification compared favorably to that of commercial ferrites, which are sintered typically in the range 1300 to 1400° C., have much larger grain and pore sizes, and which additionally show some abnormal grain growth. Such a commercial ferrite is illustrated in FIG. 5B for comparison.

The high densification achieved with the as-formed ferrite precursor powder, heated at 900° C., compacted, and finally sintered at temperatures much lower than those of commercial ferrites, was ascribed to a much higher level of chemical homogeneity and particle size uniformity achieved in the heat treated powder. Conventional blending, calcining, and size reduction processes appear unable to provide such high quality powder.

In powder samples sintered for much longer times such as 64 hours at 1100° C., and higher temperatures such as those above 1150° C., some secondary grain growth and pore entrapment within the grains was observed.

Figure 6:
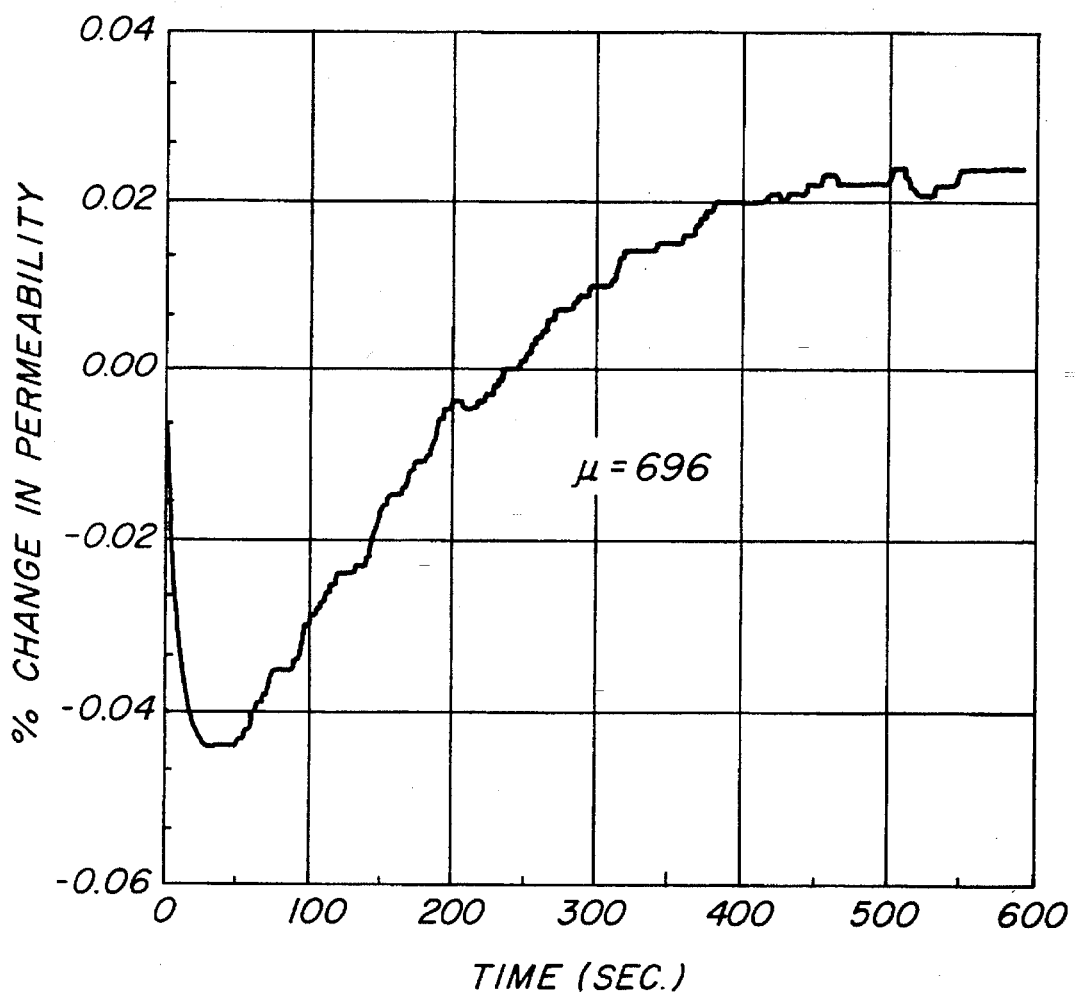
FIG. 6 relates to the manganese-zinc ferrite ceramic of FIG. 5A and shows a plot of the percent change in magnetic permeability as a function of time after a demagnetization event, illustrating both initial disaccommodation and later accommodation in permeability.

Magnetic property characterization was performed for a sample of manganese-zinc ferrite nominally identical to that shown in FIG. 5A. An initial permeability of $\mu_1=696$ was measured. The disaccommodation behavior of this sample with a peak magnetic field excitation of about 1.5 Oe. is shown in FIG. 6. An initial drop in $\mu_1$, typical of disaccommodation, was followed by a gradual rise, showing that $\mu_1$ "accommodated" as well. More than one relaxation process was, therefore, concluded to determine the time-dependent variability in $\mu_1$. Other experiments have shown that, depending on the magnitude of the peak exciting field, a range of disaccommodation and "accommodation" behavior occurs. This is shown in FIGS. 7 and 8.

Figure 7:
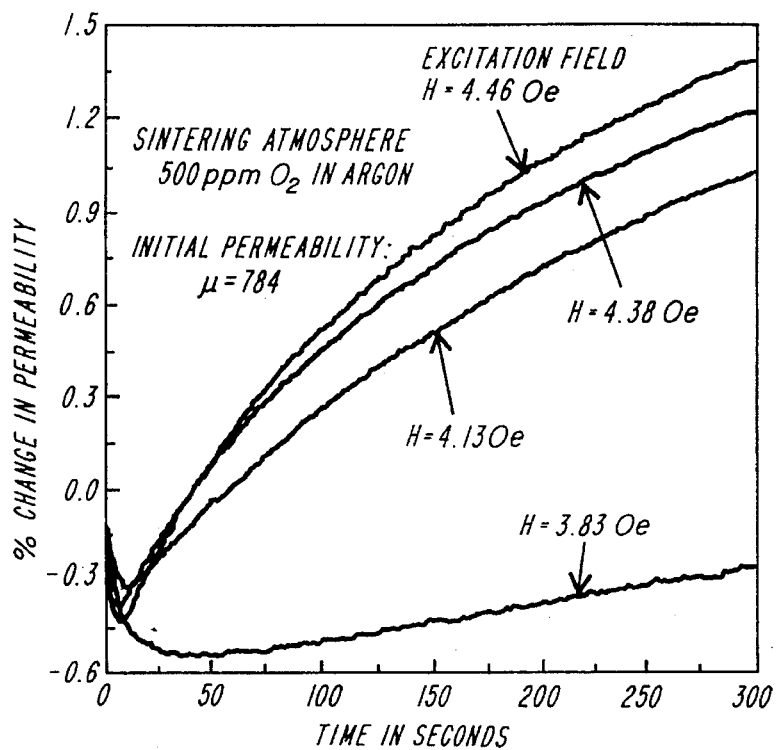
FIGS. 7 and 8 show plots of the percent change in magnetic permeability as a function of time after a demagnetization event, and illustrate that disaccommodation/accommodation behavior is a function of the magnitude of the excitation field.
Figure 8:
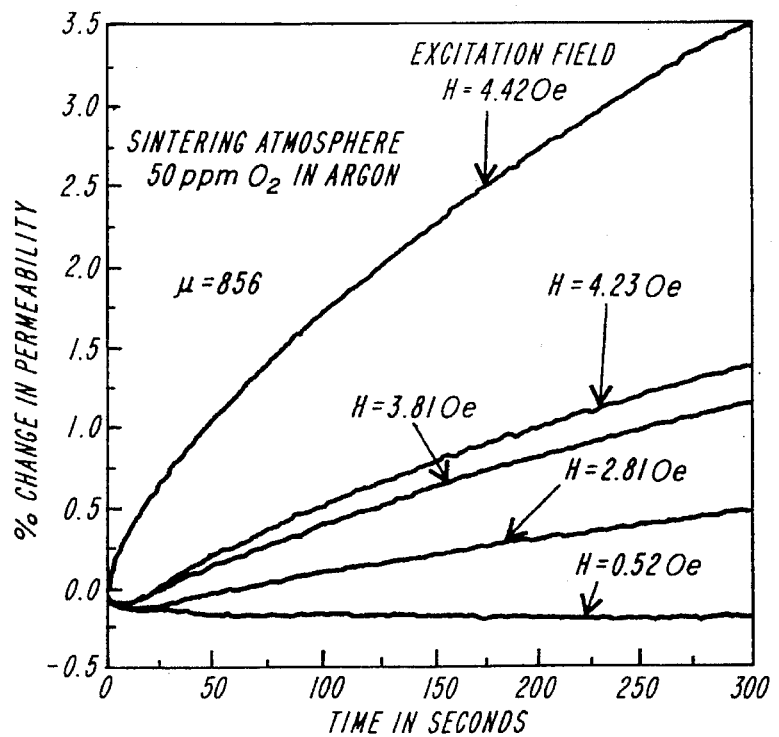

FIGS. 7 and 8 illustrate the disaccommodation/accommodation behavior of two different samples of manganese-zinc ferrite. In the Figures, the symbol H stands for the excitation field. Both specimens showed variable disaccommodations/accommodation behavior which depended upon the magnitude of the field employed for the initial excitation of the material. Consequently, disaccommodation behavior of particular ferrites should be studied for field excitation values close to those to be seen by the ferrite during use.

A value of 82 $_1=1784$ was measured for a sample of nominal 25 micrometer spray-decomposed powder which was mechanically reduced in size, preheated at 900° C., compacted, and finally sintered at 1150° C. for sixteen hours in an argon atmosphere containing 150 ppm of oxygen. Other samples, also sintered at 1150° C. but with 50 and 200 ppm oxygen levels respectively, showed similarly high $\mu_1$ values. An overall improvement in disaccommodation behavior was observed with increasing oxygen partial pressure for these samples. Metallography showed that they were comprised of single phase microstructures.

The process of the invention can be applied to the production of other ceramic materials besides manganese-zinc ferrites. For example, the process can be applied to the formation of high purity glasses of $SiO_2$, $Al_2O_3$, $B_2O_3$, and other oxides. It can also be applied to the formation of high purity and high quality refractory oxides used in electronics, such as beryllia (BeO), cordierite ($4MgO.2Al_2O_3.5SiO_2$), mullite ($3Al_2O_3.2SiO_2$), and zirconia ($ZrO_2$).

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A process for producing a ceramic material, comprising the following sequential steps:

(a) producing mixed metal oxide powder by decomposing droplets of an aqueous solution of salts of the metals desired for the ceramic under the influence of heat and in the presence of oxygen;

(b) heating the as-formed mixed metal oxide powder in an inert gas atmosphere and at a temperature below its own sintering temperature, whereby a reduction in metal oxide powder volume and an increase in metal oxide powder density is obtained;

(c) compacting said heat-densified metal oxide powder under pressure; and (d) sintering said compacted material at a temperature above that employed in said heating step.

2. The process of claim 1 wherein said metal oxide powder is a manganese-zinc ferrite.

3. The process of claim 2 wherein in said heating step the temperature is maintained within the range 900°–960° C. for a time of 5 to 10 hours.

4. The process of claim 2 wherein in said sintering step the temperature is maintained within the range 1100°–1150° C. for a time period of 16 to 48 hours.

5. A process for producing a ceramic material, comprising the following sequential steps:

(a) producing powderized mixed metal oxide comprising at least one metal selected from the group of manganese, zinc, and iron by decomposing droplets of a solution containing salts of said at least one metal under the influence of heat and in the presence of oxygen;

(b) heating the powderized metal oxide within the range of 900–960 degrees centigrade in an inert gas atmosphere, whereby a reduction in metal oxide powder volume and an increase in metal oxide powder density is obtained;

(c) compacting said heat-densified metal oxide powder under pressure; and (d) sintering said compacted material at a temperature within the range 1100–1150 degrees centigrade for a time period of 16–48 hours.

* * * * *